(12) United States Patent
Leenders et al.

(10) Patent No.: US 8,197,058 B2
(45) Date of Patent: Jun. 12, 2012

(54) SET OF CURABLE LIQUIDS AND METHODS FOR INKJET PRINTING

(75) Inventors: Luc Leenders, Herentals (BE); Eddie Daems, Herentals (BE)

(73) Assignee: Agfa Graphics NV, Mortsel (BE)

( * ) Notice: Subject to any disclaimer, the term of this patent is extended or adjusted under 35 U.S.C. 154(b) by 1091 days.

(21) Appl. No.: 12/090,553

(22) PCT Filed: Oct. 11, 2006

(86) PCT No.: PCT/EP2006/067261
§ 371 (c)(1),
(2), (4) Date: Apr. 17, 2008

(87) PCT Pub. No.: WO2007/045580
PCT Pub. Date: Apr. 26, 2007

(65) Prior Publication Data
US 2008/0250973 A1      Oct. 16, 2008

Related U.S. Application Data

(60) Provisional application No. 60/736,085, filed on Nov. 10, 2005.

(30) Foreign Application Priority Data

Oct. 21, 2005   (EP) ................................. 05109832

(51) Int. Cl.
*B41J 2/01* (2006.01)
(52) U.S. Cl. .......................................... 347/105; 522/89
(58) Field of Classification Search ............... 347/105; 522/89
See application file for complete search history.

(56) References Cited

U.S. PATENT DOCUMENTS

| | | | | |
|---|---|---|---|---|
| 4,321,404 A | * | 3/1982 | Williams et al. | 560/115 |
| 4,338,133 A | * | 7/1982 | Toyoda et al. | 106/31.58 |
| 4,500,116 A | * | 2/1985 | Ferro et al. | 283/92 |
| 4,985,473 A | * | 1/1991 | Williams et al. | 522/89 |
| 5,199,979 A | * | 4/1993 | Lin et al. | 106/287.14 |
| 5,308,685 A | * | 5/1994 | Froggatt | 428/204 |
| 5,525,400 A | * | 6/1996 | Manser et al. | 428/196 |
| 5,614,289 A | | 3/1997 | Kobayashi et al. | |
| 5,714,992 A | * | 2/1998 | Desie | 347/55 |
| 6,837,959 B2 | | 1/2005 | Daems et al. | |
| 2003/0031843 A1 | * | 2/2003 | Wu et al. | 428/210 |
| 2004/0024089 A1 | | 2/2004 | Busch et al. | |
| 2004/0050292 A1 | | 3/2004 | Nakajima et al. | |
| 2004/0052967 A1 | | 3/2004 | Takabayashi | |
| 2004/0053017 A1 | * | 3/2004 | Daems et al. | 428/195.1 |
| 2004/0063807 A1 | * | 4/2004 | Wang et al. | 523/160 |
| 2005/0004300 A1 | * | 1/2005 | Overbeek et al. | 524/502 |
| 2005/0042396 A1 | | 2/2005 | Jones et al. | |

FOREIGN PATENT DOCUMENTS

| | | | |
|---|---|---|---|
| EP | 40923 A2 | * | 12/1981 |
| EP | 0 189 125 A1 | | 7/1986 |
| EP | 0 825 218 A1 | | 2/1998 |
| EP | 1 398 175 A2 | | 3/2004 |
| EP | 1 586 459 A1 | | 10/2005 |
| WO | 01/32789 A1 | | 5/2001 |
| WO | 03/061970 A2 | | 7/2003 |

OTHER PUBLICATIONS

Official communication issued in the International Application No. PCT/EP2006/067261, mailed on Dec. 8, 2006.
Leenders et al.; "Curable Inkjet Ink Set and Methods for Inkjet Printing"; U.S. Appl. No. 12/090,551, filed Apr. 17, 2008.

* cited by examiner

*Primary Examiner* — Charlie Peng
*Assistant Examiner* — Peter Radkowski
(74) *Attorney, Agent, or Firm* — Keating & Bennett, LLP

(57) ABSTRACT

A method for inkjet printing includes, in order, the steps of a) providing an ink-receiver having an image thereon; b) forming on the ink-receiver a layer of a first curable liquid and curing the layer; and c) forming an outermost layer of a second curable liquid only on the cured first curable liquid and at least partially covering the image; wherein the second curable liquid contains an abherent agent which is absent in the first curable liquid and wherein at least one of the first and second curable liquids is inkjet printed. Also, a polymerizable abherent agent may be used in a curable liquid to prevent falsification of an ID document. Also, a set of curable liquids for inkjet printing includes a first curable liquid and a second curable liquid wherein the second curable liquid contains an abherent agent which is absent in the first curable liquid.

19 Claims, No Drawings

SET OF CURABLE LIQUIDS AND METHODS FOR INKJET PRINTING

CROSS-REFERENCE TO RELATED APPLICATIONS

This application is a 371 of PCT/EP2006/067261, filed Oct. 11, 2006. This application claims the benefit of U.S. Provisional Application No. 60/736,085, filed Nov. 10, 2005, which is incorporated by reference herein in its entirety. In addition, this application claims the benefit of European Application No. 05109832.5, filed Oct. 21, 2005, which is also incorporated by reference herein in its entirety.

BACKGROUND OF THE INVENTION

1. Field of the Invention

The present invention relates to a method for inkjet printing suitable for preparing identification documents secured against alteration and for preparing graphic displays secured against graffiti.

2. Description of the Related Art

Identification documents are used on a daily basis to prove identity, verify age, access a secure area, evidence driving privileges, cash a check, make payments, access an automated teller machine (ATM), debit an account and so on. Airplane passengers are required to show an identification document (hereafter "ID document") during check in, security screening, and prior to boarding their flight. Since they play a critical role in today's society, it is essential that ID documents cannot be falsified and are tamperproof.

Identification cards and documents, such as driving licenses, national or government identification cards, bank cards, credit cards, controlled access cards, and smart cards, carry certain items of information which relate to the identity of the bearer. Examples of such information or variable data include name, address, birth date, signature, and photo of the bearer. The ID cards or documents may in addition carry invariant data, i.e., data common to a large number of cards, for example, the name of an employer.

Inkjet printing is very suitable for handling variable data. Also, due to the compactness of inkjet printers, it has become one of the preferred printing techniques for manufacturing ID documents. Inkjet printing can be used to assemble identification cards as disclosed, for example, in U.S. 2005/0042396 (DIGIMARC) using pigmented inkjet inks for printing the variable data, but it is also possible to use inkjet printing to introduce security features. In U.S. Pat. No. 6,837,959 (AGFA), inkjet printing is used to manufacture identification cards containing a watermark revealed by partial impregnation of a UV-curable lacquer into a porous, opaque ink-receiving layer.

Another security measure used in ID documents is the application of a transparent or translucent layer which is difficult or impossible to remove from the surface of the image-receiving layer, thereby sealing the data printed on the image-receiving layer. Such layers can be applied to ID documents using UV-curable liquids as disclosed in EP 0189125 A (INTERLOCK SICHERHEITSSYSTEME) and U.S. Pat. No. 5,614,289 (KONICA).

WO 01/32789 (3M INNOVATIVE PROPERTIES) discloses a cure-on-demand curable ink composition including a homogeneous mixture of at least one of: (a) a compound having 2 reactive silyl groups, and (b) a compound having at least 3 reactive silyl groups; an acid generating catalyst; and a pigment or pigment chip. The inks are improved for curing speed and outdoor weatherability, but nothing is mentioned about their use for preventing falsification of ID documents or graffiti on billboards.

Photocurable inkjet-inks including specific oxetane compounds are disclosed in U.S. 2004/0050292 (KONISHIROKU) and U.S. 2004/0052967 (KONISHIROKU), however both are silent about methods to prevent falsification of ID documents or graffiti on billboards.

EP 1398175 A (AGFA) discloses an information carrier including a rigid sheet or web support; an opaque, porous receiving layer capable of being rendered substantially transparent by penetration by a lacquer, the receiving layer containing a pigment and a binder; an image provided onto and/or in the receiving layer; a cured pattern of a varnish provided onto the receiving layer provided with the image or onto and/or in the receiving layer provided with the image if the varnish is incapable of rendering the receiving layer transparent; and a cured layer of the lacquer provided on the receiving layer provided with the image and the cured pattern of the varnish, the lacquer having rendered the portions of the receiving layer in contact therewith substantially transparent, wherein the cured pattern of the varnish forms an opaque watermark. The patent is silent on measures to prevent falsification of information carriers.

US 2004/0024089 discloses coatings, printing inks, or paint vanishes including at least one epoxypolysiloxane that is modified with an oxyalkylene group and contains, attached to a Si atom, at least one group of the formula —R3-O—(CnH(2n–m)R4mO—)xR5 where the variables and indices are described therein. Methods for improving the slip and release properties or the leveling and wetting properties of a coating are also disclosed, but the application is silent as to methods to prevent falsification of ID documents or graffiti on billboards.

However, the availability of cheap digital printing systems such as inkjet printers also led to a new type of fraudulent action on ID documents. Overprinting and over-labeling of the personalized information, such as the common "photo swap" method, allows easy and fast abuse of a stolen ID-document.

Therefore, it would highly desirable to be able to manufacture ID documents secured against alteration using a simple manufacturing method and a compact apparatus.

SUMMARY OF THE INVENTION

In order to overcome the problems described above, preferred embodiments of the present invention provide a simple method for manufacturing a secure ID document with a compact apparatus.

Further preferred embodiments of the present invention provide a set of curable liquids for preparing ID documents which are difficult to falsify.

Further preferred embodiments of the present invention provide a set of curable liquids for preparing graffiti-proof graphic displays.

Further preferred embodiments of the present invention will become apparent from the description hereinafter.

It has been surprisingly discovered that a secure ID document can be obtained by jetting and curing a thin outermost layer containing an abherent agent on top of a cured layer on the ID document whereby the look and feel of the ID document did not change, but all attempts to add information on the image by writing on it, printing with toner, or jetting inkjet inks on the outermost layer failed. The resulting outermost layer exhibited no problems of adhesion to the ID document but instead exhibited abhesive properties to labels being applied to its surface.

It was also discovered that the inkjet printing method using a curable liquid containing an abherent agent could be advantageously used to provide posters and other graphic displays, such as point-of-purchase displays, manufactured with UV curable inkjet printing with a thin protective layer exhibiting a high resistance to graffiti without experiencing a different look and feel. This different look and feel is experienced when a clear fluoropolymer film is adhered onto the inkjet-printed poster. High resistance to graffiti requires large amounts of fluoropolymer preferably having a high molecular weight present in the inkjet liquid, which limits the possibilities for inkjet printing where inks and liquids are generally required to have a very low viscosity.

Further preferred embodiments of the present invention can be achieved with a method for inkjet printing including, in order, the steps of a) providing an ink-receiver having an image thereon; b) forming on the ink-receiver a layer of a first curable liquid and curing the layer; and c) forming an outermost layer of a second curable liquid only on the cured first curable liquid and at least partially covering the image; wherein the second curable liquid contains an abherent agent which is absent in the first curable liquid and at least one of the first and second curable liquids is inkjet printed.

Further preferred embodiments of the present invention can also be achieved by the use of a polymerizable abherent agent in a curable liquid to prevent falsification of an ID document and to protect graphic displays against graffiti.

Further preferred embodiments of the present invention can also be achieved by a set of curable liquids for inkjet printing including a first curable liquid and a second curable liquid wherein the second curable liquid contains an abherent agent which is absent in the first curable liquid.

Further preferred embodiments of the present invention can also be achieved by use of a polymerizable abherent agent in curable inkjet inks or liquids for protecting a graphic display against graffiti.

Other features, elements, steps, characteristics and advantages of the present invention will become more apparent from the following detailed description of preferred embodiments thereof.

DETAILED DESCRIPTION OF PREFERRED EMBODIMENTS

Definitions

The term "abherent agent", as used in the preferred embodiments of the present invention means a substance that prevents adhesion of a material, either to itself or to other materials.

The term "identification document" or "ID document", as used in the preferred embodiments of the present invention means a document bearing identifying data about the product or the individual whose name appears thereon. ID documents include, for example, credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards and badges. The terms "document," "card," "badge" and "documentation" are used interchangeably throughout this patent application.

The term "image", as used in the preferred embodiments of the present invention means any form of representing information, such as pictures, logos, photographs, barcodes, and text. The image may also include some form of a "security pattern", such as small dots, thin lines, or fluorescent lines.

The term "UV" is used in the preferred embodiments of the present invention as an abbreviation for ultraviolet radiation.

The term "ultraviolet radiation" as used in the preferred embodiments of the present invention means electromagnetic radiation in the wavelength range of 100 to 400 nanometers.

The term "actinic radiation" as used in the preferred embodiments of the present invention means electromagnetic radiation capable of initiating photochemical reactions.

The term "Norrish Type I initiator" as used in the preferred embodiments of the present invention, means an initiator which cleaves after excitation, yielding the initiating radical immediately.

The term "Norrish Type II initiator" as used in the preferred embodiments of the present invention, means an initiator which in its excited state forms free radicals by hydrogen abstraction or electron extraction from a second compound that becomes the actual initiating free radical.

The term "photo-acid generator" as used in the preferred embodiments of the present invention means an initiator which generates an acid or hemi-acid upon exposure to actinic radiation.

The term "thermal initiator" as used in the preferred embodiments of the present invention means an initiator which generates initiating species upon exposure to heat.

The term "functional group" as used in the preferred embodiments of the present invention means an atom or group of atoms, acting as a unit, which has replaced a hydrogen atom in a hydrocarbon molecule and whose presence imparts characteristic properties to this molecule.

The term "polyfunctional" means more than one functional group.

The term "colorant", as used in the preferred embodiments of the present invention means dyes and pigments.

The term "dye", as used in the preferred embodiments of the present invention means a colorant having a solubility of 10 mg/L or more in the medium in which it is applied and under the ambient conditions pertaining thereto.

The term "pigment" is defined in DIN 55943, herein incorporated by reference, as an inorganic or organic, chromatic, or achromatic coloring agent that is practically insoluble in the dispersion medium under the pertaining ambient conditions, hence having a solubility of less than 10 mg/L therein.

The term "dispersion", as used in the preferred embodiments of the present invention, means an intimate mixture of at least two substances, one of which, called the dispersed solid phase or colloid, is uniformly distributed in a finely divided state through the second substance, called the dispersion medium.

The term "polymeric dispersant", as used in the preferred embodiments of the present invention, means a polymeric substance for promoting the formation and stabilization of a dispersion of one substance in a dispersion medium.

The term "wt %" is used in the preferred embodiments of the present invention as an abbreviation for % by weight.

The term "alkyl" means all variants possible for each number of carbon atoms in the alkyl group, i.e., for three carbon atoms: n-propyl and isopropyl; for four carbon atoms: n-butyl, isobutyl, and tertiary-butyl; for five carbon atoms: n-pentyl, 1,1-dimethyl-propyl, 2,2-dimethylpropyl, and 2-methylbutyl etc.

Ink-Receivers

The ink-receiver suitable for a method of inkjet printing according to a preferred embodiment of the present invention may be any type of support having an image or portion of an image thereon. The image may be produced by any known imaging or printing technique.

The ink-receiver may include a support without any additional ink-receiving layers thereon and an image or portion of an image applied on the support by a technique, such as, for example, heat mode laser recording or radiation curable inkjet printing.

The ink-receiver may also be a support including one or more ink-receiving layers. The ink-receiving layer preferably contains at least a polymeric binder. The ink-receiving layer may further contain well-known conventional ingredients, such as fillers, colorants, surfactants serving as coating aids, cross-linking agents, plasticizers, cationic substances acting as mordant, light-stabilizers, pH adjusters, anti-static agents, biocides, lubricants, whitening agents, cross-linking agents, and matting agents.

The dry thickness of the ink-receiving layer or the ink-receiving layers is preferably at least 5 μm, more preferably at least 10 μm, and even more preferably at least 15 μm.

The different layers can be coated onto the support by any conventional coating technique, such as dip coating, knife coating, extrusion coating, spin coating, slide hopper coating, and curtain coating.

The ink-receiver can be transparent, translucent, or opaque.

In a preferred embodiment of the present invention, the ink-receiver is an ID document. A method for inkjet printing according to a preferred embodiment of the present invention can also be used advantageously in other types of security documents, such as banknotes, checks, shares, deeds, and other papers of value.

In another preferred embodiment of the present invention, the ink-receiver is a poster or a graphic display.

Supports

The support of the ink-receiver can be transparent but is preferably translucent or opaque.

The support of the ink-receiver can be chosen from paper type and polymeric type supports. Paper types include plain paper, cast coated paper, resin coated paper, e.g., polyethylene coated paper and polypropylene coated paper (single or double sided). Polymeric supports include cellulose acetate propionate or cellulose acetate butyrate, polyesters such as polyethylene terephthalate and polyethylene naphthalate, polyvinylchloride, polyamides, polycarbonates, polyimides, polyolefins, poly(vinylacetals), polyethers, and polysulfonamides. Other examples of useful high-quality polymeric supports for preferred embodiments of the present invention include opaque white polyesters and extrusion blends of polyethylene terephthalate and polypropylene. Polyester film supports and especially poly(ethylene terephthalate) and glycol modified poly(ethylene terephthalate) (=PET-G) are preferred. When such a polyester is used as the support material, a subbing layer may be used to improve the bonding of the ink-receiving layer to the support. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers. A corona or plasma treatment can also be used on paper type and polymeric type supports to the bonding of the ink-receiving layer to the support.

Polyolefins are preferred supports for thermal lamination onto a substrate, which is preferably a polyolefin-coated substrate, such as polyolefin-coated paper or carton.

The support of the ink-receiver may also be made from an inorganic material, such as a metal oxide or a metal (e.g., aluminum and steel). Suitable supports of the ink-receiver further include cardboard, wood, composite boards, plastic, coated plastic, canvas, textile, glasses, plant fiber products, leather, and ceramics.

ID Documents

An identification document secured against alteration can be manufactured by a method for inkjet printing according to a preferred embodiment of the present invention by completing, in order, the steps of a) providing an ID-document; b) forming on the ID-document a layer of a first curable liquid and curing the layer; and c) forming an outermost layer at least partially covering the image by jetting a second curable liquid only on the cured layer; wherein the second curable liquid contains an abherent agent which is absent in the first curable liquid.

The image or portions of the image can be provided by any suitable imaging method or combination of imaging methods. Invariant data may be applied by any impact or non-impact printing technique, such as offset printing, flexographic printing, gravure, screen-printing, and inkjet printing. For variable data, a non-impact printing technique is preferably used, inkjet printing is the preferred choice since additional security features can be included in the inkjet inks.

In a preferred embodiment, the second curable liquid is jetted according to a second image thereby enhancing the problems for falsification. The second image may include some form of a "security pattern", such as small dots, thin lines, holograms, microprint, and Moire inducing patterns which may be produced using fluorescent inks, phosphorescent inks, pearlescent inks, or other optically variable inks, such as metameric inks.

In another preferred embodiment, the outermost layer containing an abherent agent is present on both the front side and the backside of the ID document. This is especially useful when the (mirrored) image is viewed through a transparent support or when the backside of a non-transparent ID card carries a signature.

Abherent Agents

The abherent agents used in the second curable liquid of an inkjet printing method according to a preferred embodiment of the present invention cause the outermost layer to have a difficult-to-wet surface. This cured surface preferably has a surface energy of less than 28 mJ/m$^2$. The surface tension of the curable liquid is preferably less than 28 mN/m, more preferably less than 25 mN/m.

The abherent agent must be present in the cured outermost layer in a polymeric form or else it can be easily removed by wiping and using a strong organic solvent such as toluene or a chlorinated solvent. Low molecular weight fluoro-surfactants are not suitable abherent agents in the preferred embodiments of the present invention.

A single abherent agent or a mixture of abherent agents may be used as long as the abhesive properties of the outermost layer are obtained.

The abherent agent can be added to the second curable liquid as a polymerizable compound or as a polymeric abherent agent or a combination of both. Preferably, the abherent agent is a silicon modified or a fluorinated polymerizable compound.

Abherent agents suitable as the polymerizable compound constitute preferably from 20% to 99.6%, more preferably 24% to 90%, and even more preferably 30% to 80% by weight of the total composition of the second curable fluid.

Abherent agents suitable as a polymerizable compound include silicone-modified (meth)acrylates, fluorinated (meth)acrylates, fluorinated ethylenes, and epoxy-functional silane compounds.

Preferred silicone-modified acrylates include Ebecryl™ 350 (silicon diacrylate) and Ebecryl™ 1360 (silicon hexaacrylate) from UCB, Belgium; Actilane™ 800 (silicon acrylate) from AKZO-NOBEL NV; and CN990™ (siliconized urethane acrylate oligomer) from SARTOMER.

Examples of suitable epoxy-silanes include gamma-glycidoxypropyl trimethoxysilane, gamma-glycidoxypropyl triethoxysilane, beta-glycidoxyethyl trimethoxysilane, gamma-(3,4-epoxycyclohexyl)propyl trimethoxysilane, beta-(3,4-epoxycyclohexyl)ethyl trimethoxysilane, and the like. An especially preferred epoxy-silane compound is gamma-glycidoxypropyl trimethoxysilane.

Examples of suitable epoxy-silanes include (metha)acryloxyalkylalkoxysilanes such as gamma-(metha)acryloxypropyltrimethoxysilane, gamma-(metha)acryloxypropyltriethoxysilane, and gamma-(metha)acryloxypropyltriisopropoxysilane; (metha)acryloxyalkylalkoxyalkylsilanes such as gamma-(metha)acryloxypropylmethyldimethoxysilane and gamma-(metha)acryloxypropylmethyldiethoxysilane; vinyltrimethoxysilane, vinyltriethoxysilane, vinyltriisopropoxysilane, aryltriethoxysilane, vinylmethyldimethoxysilane, vinylmethyldiethoxysilane, and vinyltris(2-methoxyethoxy)silane.

Examples of fluorinated polymerizable compounds include 2,2,2-trifluoroethyl-α-fluoroacrylate (TFEFA), 2,2,2-trifluoroethyl-methacrylate (TFEMA), 2,2,3,3-tetrafluoropropyl-α-fluoroacrylate (TFPFA), 2,2,3,3-tetrafluoropropyl-methacrylate (TFPMA), 2,2,3,3,3-pentafluoropropyl-α-fluoroacrylate (PFPFA), 2,2,3,3,3-pentafluoropropyl-methacrylate (PFPMA), 1H,1H-perfluoro-n-octyl acrylate, 1H,1H-perfluoro-n-decyl acrylate, 1H,1H-perfluoro-n-octyl methacrylate, 1H,1H-perfluoro-n-decyl methacrylate, 1H,1H,6H,6H-perfluoro-1,6-hexanediol diacrylate, 1H,1H,6H,6H-perfluoro-1,6-hexanediol dimethacrylate, 2-(N-butylperfluorooctanesulfonamido)ethyl acrylate, 2-(N-ethyl perfluorooctanesulfonamido) ethyl acrylate, 2-(N-ethyl perfluorooctanesulfonamido) ethyl methacrylate, $C_8F_{17}CH_2CH_2OCH_2CH_2$—OOC—CH=$CH_2$, and $C_8F_{17}CH_2CH_2OCH_2CH_2$—OOC—C($CH_3$)=$CH_2$.

The abherent agent present in the cured outermost layer may be selected from a polymer of dimethylsiloxane acrylate, a copolymer of dimethylsiloxane acrylate, a dimethyl siloxane modified polyether, a dimethyl siloxane modified polyester, a silicone glycol copolymer, polytetrafluoroethylene, copolymers of fluorinated ethylene such as a fluorinated ethylene/propylene copolymer and a ethylene/tetrafluoroethylene copolymer, perfluoro(alkyl vinyl ether), and polyvinylidene fluoride (PVDF).

Curable Liquids

The curable liquids for use in an inkjet printing method according to a preferred embodiment of the present invention contain at least one curable compound.

The second curable liquid for use in an inkjet printing method according to a preferred embodiment of the present invention contains an abherent agent which is absent in the first curable liquid. Preferably no abherent agents are present in the first curable liquid. In a preferred embodiment, the abherent agent in the second curable liquid is a polymerizable compound.

The curable liquids for use in an inkjet printing method according to a preferred embodiment of the present invention preferably further contain an initiator or an initiator system.

The curable liquids for use in an inkjet printing method according to a preferred embodiment of the present invention may contain a polymerization inhibitor to restrain polymerization by heat or actinic radiation during storage.

The curable liquids for use in an inkjet printing method according to a preferred embodiment of the present invention may further contain at least one surfactant.

The curable liquids for use in an inkjet printing method according to a preferred embodiment of the present invention may further contain at least one solvent.

The curable liquids for use in an inkjet printing method according to a preferred embodiment of the present invention may further contain at least one biocide.

The curable liquids for use in an inkjet printing method according to a preferred embodiment of the present invention are preferably clear liquids, but they may contain a colorant or a white pigment such as titanium oxide.

The second curable liquid may be a curable inkjet ink including a colorant and an abherent agent or a mixture of abherent agents wherein the abherent agent or the mixture of abherent agents is present in an amount between 20 wt % and 99.6 wt % based on the total weight of the curable inkjet ink.

In a preferred embodiment, the first curable liquid is a curable inkjet ink from a curable color inkjet ink set used in jetting the image on an ink-receiver to provide the ink-receiver having an image thereon in an inkjet printing method according to a preferred embodiment of the present invention. Preferred curable color inkjet ink sets include cyan, magenta, and yellow curable inkjet inks. A black curable inkjet ink or other color curable inkjet inks (red, green, blue, etc.) may be added. The curable color inkjet ink set can also be a multi-density inkjet ink set including at least one combination of curable inkjet inks with about the same hue but different chroma and lightness.

The curable liquid may further contain at least one polymeric dispersant in order to obtain a stable dispersion of a pigment in the inkjet ink.

Monomers and Oligomers

Any monomer or oligomer may be used as the curable compound in the curable liquids used in an inkjet printing method according to a preferred embodiment of the present invention.

A combination of monomers, oligomers, and/or prepolymers may also be used. The monomers, oligomers, and/or prepolymers may possess different degrees of functionality, and a mixture including combinations of mono-, di-, tri- and higher functionality monomers, oligomers, and/or prepolymers may be used.

The curable compound(s) used in an inkjet printing method according to a preferred embodiment of the present invention can be any monomer and/or oligomer found in Polymer Handbook, Vol. 1+2, 4th Edition, Edited by J. BRANDRUP et al., Wiley-Interscience, 1999.

Suitable examples of monomers include acrylic acid, methacrylic acid, maleic acid (or their salts), maleic anhydride; alkyl(meth)acrylates (linear, branched and cycloalkyl) such as methyl(meth)acrylate, n-butyl(meth)acrylate, tert-butyl(meth)acrylate, cyclohexyl(meth)acrylate and 2-ethylhexyl(meth)acrylate; aryl(meth)acrylates such as benzyl (meth)acrylate and phenyl(meth)acrylate; hydroxyalkyl (meth)acrylates such as hydroxyethyl(meth)acrylate and hydroxypropyl(meth)acrylate; (meth)acrylates with other types of functionalities (e.g., oxirane, amino, polyethylene oxide, phosphate-substituted) such as glycidyl(meth)acrylate, dimethylaminoethyl(meth)acrylate, methoxypolyethyleneglycol (meth)acrylate and tripropyleneglycol(meth)acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl (meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether; and vinylesters of carboxylic acids such as vinylacetate and vinylbutyrate.

Preferred monomers and oligomers are selected from 1,6-hexanediol acrylate, alkoxylated aliphatic diacrylates, alkoxylated hexanediol diacrylate, alkoxylated neopentyl glycol diacrylate, diethylene glycol diacrylate, dipropylene glycol diacrylate, ethoxylated (10) bisphenol A diacrylate, neopentyl glycol diacrylate, triethylene glycol diacrylate, tripropylene glycol diacrylate, 2(2-ethoxyethoxy)ethyl acrylate, isobornyl acrylate, isobornyl methacrylate, isodecyl acrylate, lauryl acrylate, tetrahydrofurfuryl acrylate, tridecyl acrylate, tridecyl methacrylate, di-trimethylolpropane tetraacrylate, dipentaerythritol tetraacrylate, pentaerythritol tetraacrylate, ethoxylated (15) trimethylolpropane triacrylate, dipentaerythritol triacrylate, trimethylolpropane triacrylate, trimethylolpropane trimethacrylate, aliphatic urethane acrylates, amine modified polyether acrylate oligomers, aromatic urethane acrylates, epoxy acrylates, and polyester acrylate oligomers.

Colorants

The curable liquids used in an inkjet printing method according to a preferred embodiment of the present invention may contain a colorant. Preferably, the first curable liquid may contain a colorant. In a preferred embodiment, the first curable liquid is a curable inkjet ink from a curable color inkjet ink set used for jetting a portion of the image on an ink-receiver to provide the ink-receiver having an image thereon. Colorants used in the curable liquids may be dyes, pigments or a combination thereof. Organic and/or inorganic pigments may be used.

The colorant used in the curable liquids may be white, black, cyan, magenta, yellow, red, orange, violet, blue, green, brown, mixtures thereof, and the like.

The pigment may be chosen from those disclosed by W. HERBST et al., Industrial Organic Pigments, Production, Properties, Applications, 2nd Edition, VCH, 1997.

Particular preferred pigments are C.I. Pigment Yellow 1, 3, 10, 12, 13, 14, 17, 55, 65, 73, 74, 75, 83, 93, 109, 120, 128, 138, 139, 150, 151, 154, 155, 180, and 185.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 221, 248, 251, and 264.

Particular preferred pigments are C.I. Pigment Violet 1, 2, 19, 23, 32, 37, and 39.

Particular preferred pigments are C.I. Pigment Blue 15:1, 15:2, 15:3, 15:4, 16, 56, 61, and (bridged) aluminum phthalocyanine pigments.

Particular preferred pigments are C.I. Pigment Orange 5, 13, 16, 34, 67, 71, and 73.

Particular preferred pigments are C.I. Pigment Green 7 and 36.

Particular preferred pigments are C.I. Pigment Brown 6 and 7.

Particular preferred pigments are C.I. Pigment White 6.

Particular preferred pigments are C.I. Pigment Metal 1, 2, and 3.

For a curable black inkjet ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 150T from DEGUSSA Co., and C.I. Pigment Black 7 and C.I. Pigment Black 11.

The pigment particles in the curable liquids should be sufficiently small to permit free flow of the ink through the inkjet printing device, especially at the ejecting nozzles. It is also desirable to use small particles for maximum color strength.

The average particle size of the pigment in the pigmented inkjet ink should be between 0.005 μm and 15 μm. Preferably, the average pigment particle size is between 0.005 μm and 5 μm, more preferably between 0.005 μm and 1 μm, particularly preferably between 0.005 μm and 0.3 μm, and even more preferably between 0.040 μm and 0.150 μm. Larger pigment particle sizes may be used as long as the advantages and benefits of the present invention are achieved.

Dyes suitable for the curable liquids include direct dyes, acidic dyes, basic dyes, and reactive dyes.

Suitable direct dyes for the inkjet ink used in an inkjet printing method according to a preferred embodiment of the present invention include:

C.I. Direct Yellow 1, 4, 8, 11, 12, 24, 26, 27, 28, 33, 39, 44, 50, 58, 85, 86, 100, 110, 120, 132, 142, and 144.

C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227, and 343.

C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237.

C.I. Direct Black 2, 3, 7, 17, 19, 22, 32, 38, 51, 56, 62, 71, 74, 75, 77, 105, 108, 112, 117, 154, and 195.

Suitable acidic dyes for the inkjet ink used in an inkjet printing method according to a preferred embodiment of the present invention include:

C.I. Acid Yellow 2, 3, 7, 17, 19, 23, 25, 20, 38, 42, 49, 59, 61, 72, and 99.

C.I. Acid Orange 56 and 64.

C.I. Acid Red 1, 8, 14, 18, 26, 32, 37, 42, 52, 57, 72, 74, 80, 87, 115, 119, 131, 133, 134, 143, 154, 186, 249, 254, and 256.

C.I. Acid Violet 11, 34, and 75.

C.I. Acid Blue 1, 7, 9, 29, 87, 126, 138, 171, 175, 183, 234, 236, and 249.

C.I. Acid Green 9, 12, 19, 27, and 41.

C.I. Acid Black 1, 2, 7, 24, 26, 48, 52, 58, 60, 94, 107, 109, 110, 119, 131, and 155.

Suitable reactive dyes for an inkjet ink used in an inkjet printing method according to a preferred embodiment of the present invention include:

C.I. Reactive Yellow 1, 2, 3, 14, 15, 17, 37, 42, 76, 95, 168, and 175.

C.I. Reactive Red 2, 6, 11, 21, 22, 23, 24, 33, 45, 111, 112, 114, 180, 218, 226, 228, and 235.

C.I. Reactive Blue 7, 14, 15, 18, 19, 21, 25, 38, 49, 72, 77, 176, 203, 220, 230, and 235.

C.I. Reactive Orange 5, 12, 13, 35, and 95.

C.I. Reactive Brown 7, 11, 33, 37, and 46.

C.I. Reactive Green 8 and 19.

C.I. Reactive Violet 2, 4, 6, 8, 21, 22, and 25.

C.I. Reactive Black 5, 8, 31, and 39.

Suitable basic dyes for an inkjet ink used in an inkjet printing method according to a preferred embodiment of the present invention include:

C.I. Basic Yellow 11, 14, 21, and 32.
C.I. Basic Red 1, 2, 9, 12, and 13.
C.I. Basic Violet 3, 7, and 14.
C.I. Basic Blue 3, 9, 24, and 25.

Dyes can only manifest the ideal color in an appropriate range of pH values. Therefore, the inkjet ink used in an inkjet printing method according to a preferred embodiment of the present invention preferably further includes a pH adjuster.

The colorant may be a fluorescent colorant used to introduce additional security features. Suitable examples of a fluorescent colorant include Tinopal™ grades such as Tinopal™ SFD, Uvitex™ grades such as Uvitex™ NFW and Uvitex™ OB, all available from CIBA SPECIALTY CHEMICALS; Leukophor™ grades from CLARIANT and Blancophor™ grades such as Blancophor™ REU and Blancophor™ BSU from BAYER.

The colorant is used in the curable liquids in an amount of 0.1 to 20 wt %, preferably 1 to 10 wt % based on the total weight of the curable liquid.

Polymeric Dispersants

The curable liquid according to a preferred embodiment of the present invention may further contain a polymeric dispersant in order to obtain a stable dispersion of the pigment(s).

Polymeric dispersants usable in the preferred embodiments of the present invention are not specifically restricted, but the following resins are preferred: petroleum type resins (e.g., styrene type, acryl type, polyester, polyurethane type, phenol type, butyral type, cellulose type, and rosin); and thermoplastic resins (e.g., vinyl chloride, vinylacetate type). Specific examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

Preferably, a polymeric dispersant is used, but sometimes non-polymeric dispersants are also suitable. A detailed list of non-polymeric as well as some polymeric dispersants is disclosed by MC CUTCHEON; Functional Materials, North American Edition; Glen Rock, N.J.; Manufacturing Confectioner Publishing Co.; 1990; pp. 110-129.

Typically, dispersants are incorporated at 2.5% to 200%, more preferably at 50% to 150% by weight of the pigment.

Initiators

The curable liquids used in an inkjet printing method according to a preferred embodiment of the present invention preferably also contain an initiator. The initiator typically initiates the polymerization reaction. The initiator can be a thermal initiator, but is preferably a photo-initiator. The photo-initiator requires less energy to activate than the monomers, oligomers, and/or prepolymers to form the polymer. The photo-initiator suitable for use in the curable liquids may be a Norrish type I initiator, a Norrish type II initiator, or a photo-acid generator.

The thermal initiator(s) suitable for use in the curable liquid include tert-Amyl peroxybenzoate, 4,4-Azobis(4-cyanovaleric acid), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy)cyclohexane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

The photo-initiator or photo-initiator system absorbs light and is responsible for the production of initiating species, such as free radicals and cations. Free radicals and cations are high-energy species that induce polymerization of monomers, oligomers, and polymers and with polyfunctional monomers and oligomers thereby also inducing cross-linking.

Irradiation with actinic radiation may be achieved in two steps by changing the wavelength or intensity. In such cases, it is preferable to use 2 types of photo-initiators together.

A combination of different types of initiators, for example, a photo-initiator and a thermal initiator can also be used.

A preferred Norrish type I-initiator can be selected from benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones, and α-halophenylglyoxalates.

A preferred Norrish type II-initiator can be selected from benzophenones, thioxanthones, 1,2-diketones, and anthraquinones. A preferred co-initiator can be selected from an aliphatic amine, an aromatic amine, and a thiol. Tertiary amines, heterocyclic thiols, and 4-dialkylamino-benzoic acid are particularly preferred as the co-initiator.

Suitable photo-initiators are disclosed in J. V. CRIVELLO et al., VOLUME III: Photoinitiators for Free Radical Cationic and Anionic Polymerisation, 2nd Edition, Edited by G. BRADLEY, London, UK: John Wiley and Sons Ltd., 1998, pp. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride, and triphenylsulfonium hexafluophosphate.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e., co-initiators. Non-limiting examples of suitable cationic photo-initiators are aryldiazonium salts, diaryliodonium salts, triarylsulphonium salts, triarylselenonium salts and the like.

The curable liquids may contain a photo-initiator system containing photo-initiator(s) and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo, and/or indanthrene dyes. The amount of the sensitizer is in general from 0.01 to 15 wt %, preferably from 0.05 to 5 wt %, based in each case on the total weight of the curable liquid.

In order to increase the photosensitivity further, the curable liquids may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable liquid.

A preferred initiator system is 2,2'-bis(o-chlorophenyl)-4,4',5,5'-tetraphenyl-(7CI,8CI) 4,4'-Bi-4H-imidazole corresponding to the chemical formula:

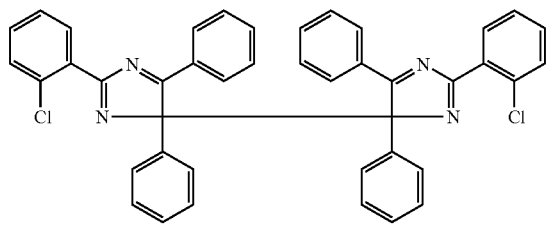

in the presence of a co-initiator such as 2-mercapto benzoxazole.

Another preferred type of initiator is an oxime ester. A suitable example has as chemical formula:

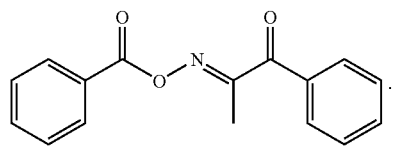

A preferred amount of initiator is 0.3-50 wt % of the total weight of the curable liquid, and more preferably 1-15 wt % of the total weight of the curable liquid.

Irradiation with actinic radiation may be achieved in two steps by changing the wavelength or intensity. In such cases, it is preferred to use 2 types of photo-initiators together.

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd, Ciba Irgastab™ UV10 from CIBA Specialty Products and Genorad™ 16 available from RAHN.

Since excessive addition of these polymerization inhibitors will lower the sensitivity to curing, it is preferred that the amount capable of preventing polymerization be determined prior to blending. The amount of a polymerization inhibitor is generally between 200 and 20,000 ppm of the total weight of the curable liquid.

Surfactants

The curable liquids used in an inkjet printing method according to a preferred embodiment of the present invention may contain at least one surfactant. The surfactant(s) can be anionic, cationic, non-ionic, or zwitter-ionic and are usually added in a total quantity below 20 wt % based on the total curable liquid weight and particularly in a total below 10 wt % based on the total weight of the curable liquid.

Dispersion Medium

The curable liquids contain monomers and/or oligomers as the dispersion medium but may further include water and/or organic solvents, such as alcohols, fluorinated solvents, and dipolar aprotic solvents.

However, the curable liquids preferably do not contain an evaporable component, but sometimes, it can be advantageous to incorporate an extremely small amount of an organic solvent in such inks to improve adhesion to the surface of the ink-receiver after UV curing. In this case, the added solvent can be any amount in the range that does not cause problems of solvent resistance and VOC, and preferably 0.1-5.0 wt %, and particularly preferably 0.1-3.0 wt %, each based on the total weight of the curable liquid.

Suitable organic solvents include alcohol, aromatic hydrocarbons, ketones, esters, aliphatic hydrocarbons, higher fatty acids, carbitols, cellosolves, and higher fatty acid esters. Suitable alcohols include, methanol, ethanol, propanol and 1-butanol, 1-pentanol, 2-butanol, and t.-butanol. Suitable aromatic hydrocarbons include toluene, and xylene. Suitable ketones include methyl ethyl ketone, methyl isobutyl ketone, 2,4-pentanedione, and hexafluoroacetone. Also, glycol, glycolethers, N-methylpyrrolidone, N,N-dimethylacetamid, and N,N-dimethylformamid may be used.

Biocides

Suitable biocides for the curable liquids used in an inkjet printing method according to a preferred embodiment of the present invention include sodium dehydroacetate, 2-phenoxyethanol, sodium benzoate, sodium pyridinethion-1-oxide, ethyl p-hydroxybenzoate, and 1,2-benzisothiazolin-3-one and salts thereof. A preferred biocide for the curable liquid is Proxel™GXL available from ZENECA COLORS.

A biocide is preferably added in an amount of 0.001 to 3 wt. %, more preferably 0.01 to 1.00 wt. %, each based on the curable liquid.

Other Additives

In addition to the constituents described above, the curable liquids may, if necessary, further contain the following additives to have the desired performance: evaporation accelerators, rust inhibitors, crosslinking agents, soluble electrolytes as conductivity aid, sequestering agents, chelating agents, compounds to introduce additional security features, etc.

Compounds to introduce additional security features include a fluorescent compound, a phosphorescent compound, a thermochromic compound, an iridescent compound, and a magnetic particle. Suitable UV-fluorescent and phosphorescent compounds include LUMILUX™ luminescent pigments from HONEYWELL, UVITEX™ OB from CIBA- GEIGY, KEYFLUOR™ dyes and pigments from KEYSTONE, and fluorescent dyes from SYNTHEGEN.

Printing Device

The second curable liquid, and preferably also the first curable liquid, used in an inkjet printing method according to a preferred embodiment of the present invention may be jetted by one or more printing heads ejecting small droplets of liquid in a controlled manner through nozzles onto an ink-receiver surface, which is moving relative to the printing head(s).

A preferred printing head for an inkjet printing system according to a preferred embodiment of the present invention is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However, an inkjet printing method according to the preferred embodiments of the present invention is not restricted to piezoelectric inkjet printing. Other inkjet printing heads can be used and include various types, such as a continuous type and thermal, electrostatic, and acoustic drop on demand type.

At high printing speeds, the liquids must be ejected readily from the printing heads, which puts a number of constraints on the physical properties of the ink, e.g., a low viscosity at the jetting temperature, which may vary from 25° C. to 110° C., a surface energy such that the printing head nozzle can form the necessary small droplets, a homogenous liquid capable of rapid conversion to a dry printed area, etc.

The viscosity of the curable liquid used in an ink-jet printing method according to a preferred embodiment of the present invention is preferably lower than 30 mPa·s, more preferably lower than 15 mPa·s, and even more preferably between 2 and 10 mPa·s at a shear rate of 100 s−1 and a jetting temperature between 10° C. and 55° C.

The inkjet printing head normally scans back and forth in a transversal direction across the moving ink-receiver surface. Often the inkjet print head does not print on the way back. Bi-directional printing is preferred for obtaining a high areal throughput. Particularly preferred, is printing in a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Device

The curable liquids can be cured by exposing them to actinic radiation, by thermal curing, and/or by electron beam curing. A preferred curing radiation is ultraviolet radiation. Preferably, the curing is performed by an overall exposure to actinic radiation, by overall thermal curing, and/or by overall electron beam curing.

The curing device may be arranged in combination with the print head of the inkjet printer, travelling therewith so that the curable liquid is exposed to curing radiation very shortly after being jetted.

In such an arrangement, it can be difficult to provide a small enough radiation source connected to and travelling with the print head. Therefore, a static fixed radiation source may be used, e.g., a source of curing UV radiation, connected to the radiation source by a flexible radiation conductive element such as a fiber optic bundle or an internally reflective flexible tube.

Alternatively, the actinic radiation may be supplied from a fixed source to the radiation head by an arrangement of mirrors including a mirror on the radiation head.

The source of radiation arranged not to move with the print head may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as a portion of the emitted light can be absorbed by the photo-initiator or photo-initiator system, may be used as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classified as UV-A, UV-B, and UV-C as follows:
UV-A: 400 nm to 320 nm;
UV-B: 320 nm to 290 nm; and
UV-C: 290 nm to 100 nm.

Furthermore, it is possible to cure the image using, consecutively or simultaneously, two light sources of differing wavelength or illuminance. For example, the first UV source can be selected to be rich in UV-C, in particular in the range of 260 nm-200 nm. The second UV source can then be rich in UV-A, e.g., a gallium-doped lamp, or a different lamp high in both UV-A and UV-B. The use of two UV sources has been discovered to have advantages, e.g., a fast curing speed.

For facilitating curing, the inkjet printer often includes one or more oxygen depletion units. The oxygen depletion units place a blanket of nitrogen or other relatively inert gas (e.g., $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Thermal curing can be performed image-wise by use of a thermal head, a heat stylus, hot stamping, a laser beam, etc. If a laser beam is used, then preferably an infrared laser is used in combination with an infrared dye in the curable liquid.

EXAMPLES

Materials

All materials used in the following examples were readily available from Aldrich Chemical Co. (Belgium) unless otherwise specified. The "water" used in the example was deionized water. The following materials were used:

SR506D™ is an isobornyl acrylate from SARTOMER.
Actilane™ 411 is a cyclic trimethylolpropane formal acrylate from AKZO-NOBEL.
Ebecryl™ 11 is a polyethylene glycol diacrylate from UCB.
Ebecryl™ 1039 is an anorganic urethane monoacrylate from UCB.
Irgacure™ 500 is a photo-initiator from CIBA SPECIALTY CHEMICALS.
Perenol™ S Konz. is a surfactant from COGNIS.
Mersolat™ H is a mixture of secondary alkane sulfonates from BAYER.
VINNAPAS™ EP1 is a 50% dispersion in water of copoly (ethylene-vinylacetate) latex from AIR PRODUCTS & CHEM.

Broxan is a 5 wt % aqueous solution (40/60 water/ethanol) of the biocide 5-Bromo-5-Nitro-1,3-Dioxane from HENKEL.
Kieselsol™ 100F is a 30% dispersion of $SiO_2$ in water from BAYER.
SIPERNAT™ 570 is a silica from DEGUSSA Co.
CAT-FLOC™ T2 is poly(diallyldimethylammonium chloride from CALGON EUROPE N.V.
POVAL™ R-3109 is a silanol modified polyvinyl alcohol from KURARAY Co.
AGFA PET is a 100 μm PET film from AGFA-GEVAERT NV, coated with a subbing layer, manufactured by applying a solution, consisting of 246 mL of a 32% latex based on a copolymer of 88 wt % vinylidene chloride, 10 wt % methylacrylate and 2 wt % itaconic acid, 48 mL of Kieselsol™ 100F-30 and 10 mL of a 4.85 wt % solution in water of Mersolat™ H, and 696 mL of demineralized water, by air knife coating to a uniaxially oriented PET (130 $m^2$/L), drying at 150° C. air temperature and stretching in a transversal direction (factor 3.6).
Stabilo™ OHPen Universal Permanent Pen Blue is a blue marker with a point of 0.4 mm from SCHLEIPER Office supplies, Belgium.
Guilbert™ Guilmarker 90 is marker from OFFICE DEPOT, France.
Corporate Express™ Chisel Tip Highlighter (Code 208 09 68) is a yellow fluorescent highlighter from CORPORATE EXPRESS.
Pentel™ Maxiflo White Board Marker (MWL5M) is a marker from EURO PENTEL S.A., France.
Monti label art.167155 is a "Laser, inkjet and copier A4-label" art.167155 from MONTI NV, Belgium.

Measurement Methods

1. Adhesion

The adhesion of a layer to the other layer or to the support was tested by pressing a 5 cm piece of Scotch Magic™ Tape 810 from 3M onto the sample and pulling it off with moderate force. The test result was evaluated as:
 OK: if no parts of the sample came off with the tape;
 Not OK: if parts of the sample came off with the tape.
A good adhesion of all layers on the support is required.

2. Writing & Erasability Test

This test checks if a sample can be falsified using a number of different pens for writing on the sample. The pens used are:
Pen 1: Guilbert™ Guilmarker 90;
Pen 2: Corporate Express™ Chisel Tip Highlighter;
Pen 3: Pentel™ Maxiflo White Board Marker; and
Pen 4: Stabilo™ OHPen Universal Permanent F Blue.
An evaluation was made in accordance with the criterion described below.
Criterion:
 1. immediate and very strong repelling of the ink is observed on writing and the written information can be very easily wiped away;
 2. almost immediate and strong repelling of the ink is observed on writing and the written information can be easily wiped away;
 3. almost immediate and strong repelling of the ink is observed on writing and the written information can be wiped away but not so easily as in criterion 2;
 4. weak repelling of the ink is observed on writing but the written information can be wiped away;
 5. weak repelling of the ink is observed on writing and the written information is difficult to wipe away;
 6. no or almost no repelling of the ink is observed on writing and the written information can hardly or not be wiped away.

It is considered that falsification of an ID card is possible with a criterion evaluated to be 4, 5, or 6, while if the criterion is evaluated to be 1, 2, or 3 falsification is prevented.

3. Print Test

An :Agorix UV curable magenta inkjet ink from AGFA was jetted according to an image containing a logo and text by a custom built ink-jet printer equipped with a :UPH print head from AGFA. A resolution of 360×360 dpi was used to print at 4 dpd (droplets per dot), wherein 1 dpd is equal to a droplet volume of 3 pL. An evaluation was made in accordance with the criterion described below.
Criterion:
 −=no imaging possible on the sample
 +=imaging on the sample
To prevent falsification of an ID document, no imaging by an inkjet printer should be possible. When no imaging was possible, i.e., a non-homogenous spreading of droplets and uncontrollable formation of large and small droplets, after curing the "falling apart" image could be easily removed from the ink-receiver.

4. Label Test

A Monti label art.167155 was applied to the sample. An evaluation was made in accordance with the criterion described below.
Criterion:
 −=label can easily be peeled off;
 +=label sticks well to the sample and is difficult to remove.
Over-labeling of the personalized information, e.g., the photo of a person, in an ID document should not be possible. If a label does not adhere to an ID document due to its abhesive properties, it is immediately observed by the authority instructed to check the ID document.

Example 1

This example illustrates that writing and over-labeling of ID cards can be prevented by using an abherent agent in the outermost layer of a second curable liquid on a layer of first curable liquid.

Three comparative samples COMP-1 to COMP-3 and an inventive sample INV-1 were prepared according to Table 1.

TABLE 1

| Sample | First curable liquid | Second curable liquid |
|---|---|---|
| COMP-1 | No | No |
| COMP-2 | Yes | No |
| COMP-3 | No | Yes |
| INV-1 | Yes | Yes |

Preparation of the Comparative Sample COMP-1

First, a dispersion A was prepared by mixing the ingredients according to Table 2.

TABLE 2

| Ingredient | Amount in g |
|---|---|
| SIPERNAT ™ 570 | 18.70 |
| POVAL ™ R-3109 | 2.70 |
| CAT-FLOC ™ T2 | 1.70 |
| Broxan | 0.03 |
| Citric acid | 0.03 |
| Water | 55.14 |

This dispersion A was then used to prepare an ink-receiver composition according to Table 3.

TABLE 3

| Ingredient | Amount in g |
| --- | --- |
| Dispersion A | 78.30 |
| VINNAPAS ™ EP1 | 9.90 |
| CAT-FLOC ™ T2 | 0.40 |
| cetyltrimethylammonium bromide | 2.00 |
| Water | 9.40 |

The thus prepared ink-receiver composition was coated onto the transparent subbed support AGFA PET at a coverage of 100 g/m² and dried with air.

After drying, the ink receiving layer was printed by means of an EPSON PHOTO STYLUS™ R800 ink jet printer with multiple sets of digitally stored personal information to deliver the comparative sample COMP-1.

Preparation of the Comparative Sample COMP-2

The comparative sample COMP-1 was overcoated with a first curable liquid LIQ-1 lacking an abherent agent and having a composition according to Table 4.

TABLE 4

| Ingredient | Amount in g |
| --- | --- |
| SR506D ™ | 124.87 |
| Actilane ™ 411 | 74.33 |
| Ebecryl ™ 11 | 53.51 |
| Ebecryl ™ 1039 | 39.73 |
| Irgacure ™ 500 | 14.87 |
| Perenol ™ S Konz | 2.70 |

The first curable liquid LIQ-1 was coated on the comparative sample COMP-1 using a BRAIVE barcoater with a 50 μm wired bar. The ink-receiver became totally transparent after penetration of the first curable liquid into the ink-receiver. The coated layer was cured using a Fusion DRSE-120 conveyer, equipped with a Fusion VPS/1600 lamp (D-bulb 240 W/cm), which transported the samples under the UV lamp on a conveyer belt at a speed of 33.5 cm/s to deliver comparative sample COMP-2. To obtain a complete curing, two passes were necessary.

Preparation of the Inventive Sample INV-1

In the printed circuit industry, photographic masks bearing a circuit pattern are known as phototools. The company 3M has developed a coating solution, SCOTCHGARD™ Phototool Protector, to deal with scratching and abrasion, which is a serious problem for phototools. We have discovered that this solvent-free, low-viscosity solution contains the polymerizable abherent agent gamma-glycidoxypropyl trimethoxysilane and that it was possible to jet this solution. The solution had a viscosity at 25° C. of 11.4 mPa·s and a surface tension of 23.6 mN/m.

The SCOTCHGARD™ Phototool Protector solution was jetted on the comparative sample COMP-2 with a custom built ink-jet printer equipped with a :UPH print head from AGFA. A resolution of 360×360 dpi was used to print at 8 dpd (droplets per dot), wherein 1 dpd is equal to a droplet volume of 3 pL.

The jetted sample was cured using a Fusion DRSE-120 conveyer, equipped with a Fusion VPS/1600 lamp (D-bulb 240 W/cm), which transported the samples under the UV lamp on a conveyer belt at a speed of 33.5 cm/s to deliver the inventive sample INV-1.

Preparation of the Comparative Sample COMP-3

The SCOTCHGARD™ Phototool Protector solution was also jetted on the comparative sample COMP-1 with the custom built ink-jet printer equipped with a :UPH print head from AGFA. A resolution of 360×360 dpi was used to print at 8 dpd.

The jetted sample was cured using a Fusion DRSE-120 conveyer, equipped with a Fusion VPS/1600 lamp (D-bulb 240 W/cm), which transported the samples under the UV lamp on a conveyer belt at a speed of 33.5 cm/s to deliver the comparative sample COMP-3.

Results and Evaluation

The comparative samples COMP-1 to COMP-3 and the inventive sample INV-1 were tested on their adhesion and their possibilities of falsification. The results are shown in Table 5.

TABLE 5

| Sample | Adhesion | Writing & erasability test | | | | Print test | Label test |
| --- | --- | --- | --- | --- | --- | --- | --- |
| | | Pen 1 | Pen 2 | Pen 3 | Pen 4 | | |
| COMP-1 | Not OK | 6 | 6 | 6 | 6 | + | + |
| COMP-2 | OK | 6 | 6 | 6 | 6 | + | + |
| COMP-3 | Not OK | 6 | 5 | 6 | 6 | + | (+) |
| INV-1 | OK | 1 | 1 | 1 | 1 | − | − |

From Table 5 it should be clear that a first curable liquid was necessary before jetting the second curable liquid containing the abherent agent to obtain a tamperproof ID document. In comparative sample COMP-3, the first curable liquid was omitted and it was observed that the coated ink-receiver layer of COMP-1 not only became opaque but also no longer adhered to the support on application of the curable liquid containing the abherent agent. Hence, it was difficult to evaluate over-labeling.

It can also be seen in Table 5 that, besides writing or over-labeling, printing of a radiation curable inkjet ink on the inventive sample INV-1 was not possible in order to provide a new layer containing falsified information on top of the outermost layer.

The same results were obtained with an EPSON PHOTO STYLUS™ R300 ink jet printer using dye based inkjet inks instead of an EPSON PHOTO STYLUS™ R800 ink jet printer using pigmented inkjet inks.

Example 2

This example illustrates which amount of abherent agent in the second curable liquid for forming the outermost layer is required in order to obtain secure ID documents.

The SCOTCHGARD™ Phototool Protector solution contains about 60 wt % of gamma-glycidoxypropyl trimethoxysilane as abherent agent, no colorants, and triphenylsulfonium hexafluoroantimonate as cationic photoinitiator. The SCOTCHGARD™ Phototool Protector solution was diluted by adding the monofunctional Actilane™ 411 monomer according to Table 6 and used to prepare the inventive samples INV-2 to INV-4 and comparative sample COMP-4 in the same manner as inventive sample INV-1 was prepared in EXAMPLE 1.

TABLE 6

| Sample | SCOTCHGARD ™ Phototool Protector solution | Actilane ™ 411 diluent monomer | Amount of abherent agent |
|---|---|---|---|
| INV-1 | 100 wt % | 0 wt % | >60 wt % |
| INV-2 | 80 wt % | 20 wt % | >48 wt % |
| INV-3 | 60 wt % | 40 wt % | >36 wt % |
| INV-4 | 40 wt % | 60 wt % | >24 wt % |
| COMP-4 | 20 wt % | 80 wt % | >12 wt % |

Results and Evaluation

The comparative samples COMP-2 and COMP-4 and the inventive samples INV-1 to INV-4 were tested in the same way as in EXAMPLE 1 on their adhesion and their possibilities of falsification. The results are shown in Table 7.

TABLE 7

| Sample | Amount of abherent agent | Adhesion | Writing & erasability test Pen 1 | Pen 2 | Pen 3 | Pen 4 | Label test |
|---|---|---|---|---|---|---|---|
| INV-1 | >60 wt % | OK | 1 | 1 | 1 | 1 | − |
| INV-2 | >48 wt % | OK | 1 | 2 | 1 | 1 | − |
| INV-3 | >36 wt % | OK | 2 | 2 | 1 | 2 | − |
| INV-4 | >24 wt % | OK | 3 | 2 | 2 | 2 | − |
| COMP-4 | >12 wt % | OK | 6 | 4 | 4 | 6 | + |
| COMP-2 | 0 wt % | OK | 6 | 6 | 6 | 6 | + |

From Table 7 it should be clear that the second curable liquids containing 24 wt % or more of the abherent agent delivered samples secured against falsification.

The same results were obtained with an EPSON PHOTO STYLUS™ R300 ink jet printer using dye based inkjet inks instead of an EPSON PHOTO STYLUS™ R800 ink jet printer using pigmented inkjet inks.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for inkjet printing comprising, in order, the steps of:
   a) providing an ink-receiver having a first image thereon;
   b) forming a layer of a first curable liquid on the ink-receiver, and curing the layer; and
   c) jetting according to a second image an outermost layer of a second curable liquid on the cured layer of the first curable liquid; wherein
   the second curable liquid contains an abherent agent which is absent in the first curable liquid; and
   the abherent agent is present in the second curable liquid in an amount between 20 wt % and 99.6 wt % based on a total weight of the second curable liquid.

2. The method for inkjet printing according to claim 1, wherein the ink-receiver having the first image thereon is an ID document or a graphic display.

3. The method for inkjet printing according to claim 1, wherein the first curable liquid is a curable inkjet ink from a curable color inkjet ink set used for jetting a portion of an image on an ink-receiver to provide the ink-receiver having the first image thereon.

4. The method for inkjet printing according to claim 1, wherein the abherent agent is a silicon-modified polymerizable compound or a fluorinated polymerizable compound.

5. The method for inkjet printing according to claim 4, wherein the abherent agent is selected from the group consisting of silicone-modified (meth)acrylates, fluorinated (meth)acrylates, fluorinated ethylenes, and epoxy-functional silane compounds.

6. The method for inkjet printing according to claim 5, wherein the epoxy-functional silane compound is selected from the group consisting of gamma-glycidoxypropyl trimethoxysilane, gamma-glycidoxypropyl triethoxysilane, beta-glycidoxyethyl trimethoxysilane, gamma-(3,4-epoxycyclohexyl)propyl trimethoxysilane, and beta-(3,4-epoxycyclohexyl)ethyl trimethoxysilane.

7. The method for inkjet printing according to claim 5, wherein the fluorinated polymerizable compound is selected from the group consisting of 2,2,2 trifluoroethyl-α-fluoroacrylate (TFEFA); 2,2,2-trifluoroethyl-methacrylate (TFEMA); 2,2,3,3-tetrafluoropropyl-α-fluoroacrylate (TFPFA); 2,2,3,3 tetrafluoropropyl-methacrylate (TFPMA); 2,2,3,3,3 pentafluoropropyl α fluoroacrylate (PFPFA); 2,2,3,3,3 pentafluoropropyl-methacrylate (PFPMA); 1H,1H-perfluoro-n-octyl acrylate; 1H,1H-perfluoro-n-decyl acrylate; 1H,1H perfluoro-n-octyl methacrylate; 1H,1H-perfluoro-n-decyl methacrylate; 1H,1H,6H,6H-perfluoro-1,6-hexanediol diacrylate; 1H,1H,6H,6H-perfluoro-1,6-hexanediol dimethacrylate; C8F17CH2CH2OCH2CH2-OOC—CH=CH2; and C8F17CH2CH2OCH2CH2-OOC—C(CH3)=CH2.

8. The method for inkjet printing according to claim 1, further comprising the step of:
   d) curing the outermost layer; wherein
   the cured outermost layer contains a polymeric abherent agent selected from the group consisting of a polymer of dimethylsiloxane, a copolymer of dimethylsiloxane, a dimethyl siloxane modified polyether, a dimethyl siloxane modified polyester, a silicone glycol copolymer, polytetrafluoroethylene, copolymers of fluorinated ethylene, perfluoro(alkyl vinyl ether), and polyvinylidene fluoride.

9. The method for inkjet printing according to claim 1, wherein the second curable liquid contains at least one compound selected from the group consisting of a colorant, a fluorescent compound, a phosphorescent compound, an iridescent compound, and a magnetic particle.

10. The method for inkjet printing according to any of the claim 1, wherein the second curable liquid is an optically variable ink.

11. A set of curable liquids for inkjet printing comprising:
    a first curable liquid; and
    a second curable liquid; wherein
    the first curable liquid is a curable inkjet ink including a colorant, and the second curable liquid contains an abherent agent which is absent in the first curable liquid; and
    the abherent agent is present in the second curable liquid in an amount between 20 wt % and 99.6 wt % based on a total weight of the second curable liquid.

12. The set of curable liquids for inkjet printing according to claim 11, wherein the second curable liquid is a curable inkjet ink containing a colorant.

13. The set of curable liquids for inkjet printing according to claim 12, wherein the abherent agent is a silicon-modified or a fluorinated polymerizable compound.

14. The set of curable liquids for inkjet printing according to claim 13, wherein the abherent agent is selected from the group consisting of silicone-modified (meth)acrylates, fluorinated (meth)acrylates, fluorinated ethylenes, and epoxy-functional silane compounds.

15. The set of curable liquids for inkjet printing according to claim 14, wherein the epoxy-functional silane compound is selected from the group consisting of gamma-glycidoxypropyl trimethoxysilane, gamma-glycidoxypropyl triethoxysilane, beta-glycidoxyethyl trimethoxysilane, gamma-(3,4-epoxycyclohexyl)propyl trimethoxysilane, and beta-(3,4-epoxycyclohexyl)ethyl trimethoxysilane.

16. The set of inkjet curable liquids according to claim 14, wherein the fluorinated polymerizable compound is selected from the group consisting of 2,2,2 trifluoroethyl-α-fluoroacrylate (TFEFA); 2,2,2-trifluoroethyl-methacrylate (TFEMA); 2,2,3,3-tetrafluoropropyl-α-fluoroacrylate (TFPFA); 2,2,3,3 tetrafluoropropyl-methacrylate (TFPMA); 2,2,3,3,3 pentafluoropropyl a fluoroacrylate (PFPFA); 2,2,3,3,3 pentafluoropropyl-methacrylate (PFPMA); 1H,1H-perfluoro-n-octyl acrylate; 1H,1H-perfluoro-n-decyl acrylate; 1H,1H perfluoro-n-octyl methacrylate; 1H,1H-perfluoro-n-decyl methacrylate; 1H,1H,6H,6H-perfluoro-1,6-hexanediol diacrylate; 1H,1H,6H,6H-perfluoro-1,6-hexanediol dimethacrylate; $C_8F_{17}CH_2CH_2OCH_2CH_2$-OOC—CH=CH2; and $C_8F_{17}CH_2CH_2OCH_2CH_2$-OOC—C(CH3)=CH2.

17. The set of curable liquids for inkjet printing according to claim 11, wherein at least one of the curable liquids contains at least one compound selected from the group consisting of a fluorescent compound, a phosphorescent compound, a thermochromic compound, an iridescent compound, and a magnetic particle.

18. The set of curable liquids for inkjet printing according to claim 11, wherein the curable inkjet ink is an optically variable ink.

19. A method for protecting a graphic display against graffiti comprising:
    printing a curable inkjet ink or curable liquid having a polymerizable abherent agent as an outermost layer; wherein
    the polymerizable abherent agent is present in the curable inkjet ink or the curable liquid in an amount between 20 wt % and 99.6 wt % based on a total weight of the curable inkjet ink or the curable liquid.

* * * * *